United States Patent [19]

Brahms et al.

[11] Patent Number: 5,144,469

[45] Date of Patent: Sep. 1, 1992

[54] METHOD FOR THE TRANSMISSION OF DATA BETWEEN TWO STATIONS BY MEANS OF OPTICAL WAVEGUIDES

[75] Inventors: Martin Brahms, Hanover; Ziaedin Chahabadi, Munder, both of Fed. Rep. of Germany

[73] Assignee: Ke Kommunications Elektronik GmbH & Co., Fed. Rep. of Germany

[21] Appl. No.: 725,544

[22] Filed: Jul. 3, 1991

Related U.S. Application Data

[63] Continuation-in-part of Ser. No. 353,966, May 18, 1989.

[30] Foreign Application Priority Data

Jun. 3, 1988 [DE] Fed. Rep. of Germany ....... 3818936

[51] Int. Cl.$^5$ .............................................. H04B 10/04
[52] U.S. Cl. .................................... 359/181; 341/73; 370/110.1; 371/57.1; 359/158; 359/184
[58] Field of Search ............... 359/135, 158, 173, 181, 359/184; 371/57.1, 61; 341/73; 370/110.1

[56] References Cited

U.S. PATENT DOCUMENTS

| | | | |
|---|---|---|---|
| 4,524,462 | 6/1985 | Cottatelucci | 455/608 |
| 4,736,464 | 4/1988 | Tauson | 455/608 |
| 4,759,040 | 7/1988 | Kawata | 375/87 |
| 4,823,363 | 4/1989 | Yoshida | 370/105.3 |
| 4,847,833 | 7/1989 | Doering | 370/110.1 |

FOREIGN PATENT DOCUMENTS

| | | | |
|---|---|---|---|
| 0172462 | 8/1986 | Japan | 455/608 |
| 0150942 | 7/1987 | Japan | 370/1 |
| 0221725 | 9/1988 | Japan | 370/1 |
| 0016139 | 1/1989 | Japan | 455/608 |

OTHER PUBLICATIONS

Takasaki, "Line Coding Plans for Fiber Optic Communication Systems" International Conference on Communications, vol. 11, pp. 32-20-32-24, Jun. 16, 1975.
Takasaki, "Line Coding Plan for Fiber Optic Communication Systems" Proc. of IEEE pp. 1081-1082, Jul. 1975.

Primary Examiner—Edward L. Coles, Sr.
Assistant Examiner—L. Pascal
Attorney, Agent, or Firm—Ware, Fressola, Van Der Sluys & Adolphson

[57] ABSTRACT

In a system wherein a main channel of data is transmitted between two stations by means of an optical waveguide, an additional optical channel may be transmitted. Bits of the additional optical channel are inserted into the main channel at a transcoder in the transmitting station in place of bits of the main channel at defined spacings, known to the transcoder of the receiving station, with a bit rate lower than that of the main channel. The inserted bits are removed from the optical main channel at the receiving station. The bits of the additional optical channel inserted into the main channel are double bits that are identical to a forbidden bit combination that results during the recoding of an electrical AMI code into an optical CMI code. In the receiving station, the double bits of the main channel replaced by the bits of the additional optical channel are recovered by using sequential logic and memory to apply the fixed rules of the electrical AMI code.

13 Claims, 3 Drawing Sheets

METHOD FOR THE TRANSMISSION OF DATA BETWEEN TWO STATIONS BY MEANS OF OPTICAL WAVEGUIDES

CROSS-REFERENCE TO RELATED APPLICATIONS

This application is a Continuation-In-Part of U.S. application Ser. No. 07/353,966, filed May 18, 1989.

BACKGROUND OF THE INVENTION

1. Field of the Invention

The present invention relates to data transmission over optical waveguides, and more particularly to a method for inserting an additional optical channel into a main optical channel transmitting data between two stations.

2. Description of the Prior Art

It has become commonplace to transmit data between two stations using optical waveguides, which allow for the transmission of data over very long distances without the need for intermediate amplifiers. Optical waveguides have very wide bandwidths and very low attenuation of the transmitted light signals. Another advantage of optical waveguides is that the data transmission is not affected by external electrical or magnetic noise fields. The present technology allows data to be transmitted at very high transmission or bit rates as, for example, nominal rates of 34 M bit/second and 140 M bit/second.

Data is normally transmitted using standardized codes having fixed rules. These codes are used to prevent d.c. buildup on electrical transmission lines and to eliminate excessively long strings of zeroes which can hamper clock recovery. The data is usually provided in electrical form conforming to a known electrical coding system and is thereafter recoded in a transcoder to a corresponding optical code for transmission over the optical waveguides. At a receiving station, the optical code is recoded into the electrical code in another transcoder.

A typical electrical code may be the ternary AMI code having three different states, which electrical code would be recoded into an optical code such as the CMI code for optical transmission. The CMI code is a binary non-return to zero code. Another electrical code in common use is the HDB3 code which is recoded into the MCMI optical code.

With these known optical transmission procedures, a significantly larger number of channels can be transmitted with the use of significantly fewer optical waveguides, as compared to the conventional technology used with metallic conductors. Nevertheless, additional capacity may be required, and additional channels may be needed on existing transmission paths without affecting the transmitted data.

SUMMARY OF THE INVENTION

The present invention contemplates a method of transmitting data wherein at least one additional optical channel can be transmitted over an existing optical transmission path carrying a main channel. In order to achieve this purpose, bits of the additional channel, having a bit rate lower than that of the main channel, are inserted into the main optical channel at the transcoder of the transmitting station. The bits of the additional channel are inserted in any desired positions in the main channel and replace the bits of the main channel that were in the desired positions. The position of the inserted bits must have defined spacings known to the transcoder of the receiving station, so that the information conveyed by the inserted bits may be extracted from the main optical channel at the receiver.

In the recoding of the electrical signal into the optical signal, the single ternary bit of the electrical code is converted into two binary bits in the optical code, which leaves one bit combination in the optical code unused, or forbidden. The forbidden bit combination is inserted into the main optical channel to represent the data of the additional optical channel.

In the receiver, the forbidden double bit combinations of the additional optical channel are extracted, while the replaced double bits of the main optical channel are recovered through the use of sequential logic in the application of the fixed rules of the electrical code.

Only bits of the additional channel of one significance are inserted as double bits into the main channel. The bits of the additional channel with the other significance are not inserted into the channel, and the existing bits of the main channel remain unchanged when these bits occur.

Thus, the present invention contemplates a method of transmitting an additional optical channel in a system for transmission of a main channel of data between a transmitting and receiving station by means of an optical waveguide. The transmitting station receives the data as electrical bits coded in accordance with fixed rules, and a transcoder in the transmitting station recodes the data to an optical code having double bits representing each electrical bit for transmission over the optical waveguide. The receiving station includes a transcoder for recoding the optical double bits back to the fixed electrical code. Optical double bits representing one significance of the additional optical channel, with a bit rate lower than that of the main channel, are inserted into the main channel at the transcoder of the transmitting station, in place of double bits of the main channel at defined spacings. The bits of the additional optical channel being inserted into the main channel as double bits are identical to a forbidden bit combination that results during the recoding of the electrical to the optical code. The optical double bits are sampled from the main channel at said defined spacings in the transcoder of the receiving station. The presence of the forbidden bit combination in a sampled optical double bit represents a bit of one significance of the additional optical channel and the absence of a forbidden bit combination in a sampled optical double bit representing a bit of the additional optical channel of the opposite significance. The bits of the main channel that were replaced by the forbidden bit combination are recovered at the receiving station by means of sequential logic and memory used to apply the fixed rules of the electrical code to identify the replaced bits.

The method of the present invention may be used for the insertion of an additional channel for service purposes, to be used by operating personnel for voice communication during installation of a transmission line. The method may also be used after installation for monitoring purposes, or for the exchange of other information, without affecting the main channel. In any event, the method can be used when the capacity of the transmission line must be increased without affecting the main channel.

DESCRIPTION OF THE INVENTION

Figure 1:
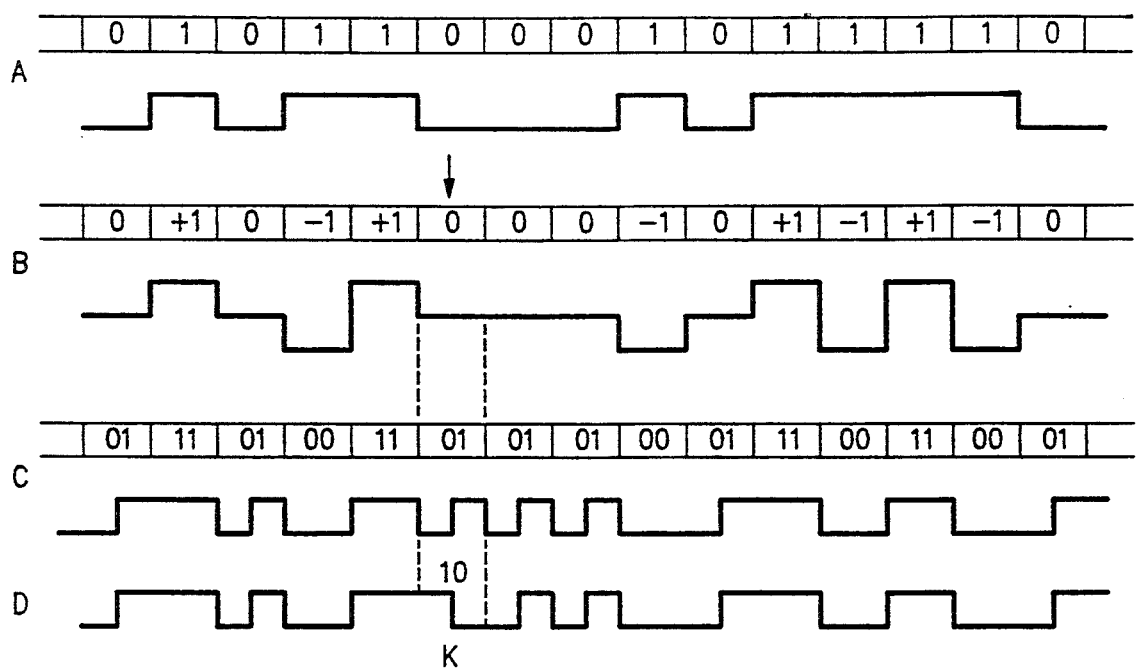
FIGS. 1 through 4 illustrate various codings of one stream of data. Line A illustrates the binary data being transmitted. Line B illustrates the binary data coded according to an AMI code. Line C illustrates the AMI coded data recoded to a CMI code. Line D illustrates the effect of the insertion of a forbidden bit combination at different locations in each of FIGS. 1 through 4.

The present invention provides a method for transmitting an additional optical channel of data over an optical waveguide transmission line used to transmit a main optical channel of data. In the main channel, binary data as illustrated on line A of FIGS. 1-4 is provided in binary form, with the bits being represented as 1s or 0s. This data may be coded into an electrical code, such as AMI (Alternate Mark Inversion) code, for the purpose of preventing a d.c. buildup on the transmission line. In the AMI code, the 0 level signals are represented as a 0 voltage, while the 1 signals are represented by alternating positive and negative level signals, as illustrated in line B of FIGS. 1-4. Another form of electrical code known as HDB3 (High Density Bipolar 3) code is used so as to prevent an excessively long string of 0 bits, which would make clock recovery difficult. In the HDB3 code, a string of four 0s would be replaced by three 0s followed by a V bit. The V bit is a one bit having a polarity which would violate the AMI rules. As an alternative, the four 0s can be replaced by a combination of B00V, wherein B represents an inserted 1 conforming to the AMI rules. The choice of 000V or B00V is made so that the number of B pulses between consecutive V pulses is odd. This will assure that successive V pulses are of alternate polarity, so no d.c. component is introduced.

At the transcoder of the transmission station, the AMI-coded electrical signal is converted to an optical signal having a CMI (Coded Mark Inversion) code. The CMI code is a two-level, non-return to 0 code, wherein binary 0 is coded so that both levels are attained consecutively for each half of a bit period. Binary 1 is coded as either amplitude level for one full bit period, with the amplitude levels alternating for successive 1s. In the illustrations of this specification the two levels will be designated 0 and 1. The CMI recoding of the AMI signal is illustrated in line C of FIGS. 1-4. In the AMI to CMI recoding, the following conversions apply:

| AMI | CMI |
| --- | --- |
| +1 | 11 |
| −1 | 00 |
| 0 | 01 |

It should be noted that the CMI double bit combination of 10 is not used, and this is referred to as a forbidden bit combination.

The electrical HDB3 code is recoded to the MCMI (Modified Coded Mark Inversion) code, for which the same bit conversions are applicable, as described above for AMI to CMI conversion.

The additional optical channel is realized by inserting the forbidden CMI double bit combination into any desired position of the main optical channel, as a replacement for a double bit combination of the main channel. This insertion is accomplished at the transcoder of the transmitting station. Any double bit combination of the main channel may be replaced by the forbidden bit combination. However, in certain instances, if a particular double bit is replaced, a second double bit will also be replaced by the forbidden combination, as will be discussed subsequently.

The forbidden bit combination can be easily recognized at the receiver station; however, it is important that the spacing of the bits of the additional channel be known to the receiver so that the additional channel may be extracted from known time slots at the receiving station. The spacing of the inserted bits of the additional channel can be constant or can vary, so long as the receiver knows how the spacing varies.

While the information on the additional channel represents binary 1s and 0s, only a bit of one significance is inserted as a forbidden bit combination. For example, if a 1 in the additional channel is inserted as a double bit, the 0s of the additional channel will not be inserted. The receiver will recognize the absence of the forbidden double bit at a known time slot of the additional channel as a 0. In like manner, a 0 of the additional channel could be represented by the forbidden double bit combination, and in such case a 1 would not be inserted.

In a preferred embodiment, the bits of the additional channel are inserted into the main channel with constant spacing. The transcoder of the receiving station is provided with the spacing information so that the additional channel can be sorted out from the main channel without difficulty. It is contemplated that the spacing used may be fixed for transcoders of the transmitting and receiving stations, and that the same spacing will always be used. However, it is possible that the transmission and receiving stations could have sufficient intelligence so that the spacings could be varied in accordance with transmission requirements. Prior to the start of a transmission, information concerning the spacings would first be transmitted to the receiver and stored therein. This information could then be used to sample the additional channel information.

While the present invention is being described as a method for providing an additional channel, it should be understood that two or more subchannels could be provided by the use of multiplexers in the additional channels.

Since the information of the main channel must not be distorted, the replaced double bits of the main channel must be recovered at the receiving station. This unique aspect of the present invention is made possible by the fact that the coding rules are fixed, and the signals are transmitted with a certain degree of regularity in the digital electrical code. Because of this regularity, it is possible to reconstruct in a relatively simple manner which double bit or double bits were replaced by looking to the double bits of the main channel following and/or preceding the replaced double bits through the use of a memory-containing sequential logic in the receiver station. The implementation of the required logic could take on many forms which would be readily apparent to a logic designer having the benefit of the specification.

A method of the present invention will be explained using two different electrical codes as examples. For the examples, an additional channel with a bit rate of 1.7 M bit/second is inserted into a main channel with a transmission or bit rate of 34.384 M bits/second. In this example, the bit rate of the additional channel was selected to be 1/20th of the rate of the main channel. Thus, every 20th bit of the main channel will be sampled in order to extract the additional channel. The timing for this sampling can be established when the first forbidden double bit is sensed, thereafter each 20th bit will be sampled.

The optical code for the main channel is the CMI code recoded from the ternary AMI code. The rules for these codes were previously discussed. In the subsequent discussion, the inserted forbidden bit combination 10 will be referred to as a 'K' bit. The K bit will be inserted to indicate a 1 state of the additional channel, with the 0 state being indicated by the absence of a replacement bit. Thus, every 20th bit of the main channel is replaced by a K bit if the additional channel has a 1 in its bit sequence. If the additional channel has a 0, nothing happens, and the main channel double bit remains unaltered.

At the receiver station, the recovery of the replaced double bit of the main channel by the memory-containing sequential logic of the receiving station takes place as described below. For purposes of this discussion, the designations of the AMI code are used in place of the double bits of the CMI code actually present.

Referring to FIG. 1, it is shown how a K bit replaces a 0 which is followed by another 0 in the AMI code. This results in a 1001 bit sequence in the CMI code. This sequence in the sequential logic is recognized by definition as a 0 having been replaced by the K bit.

Figure 2:
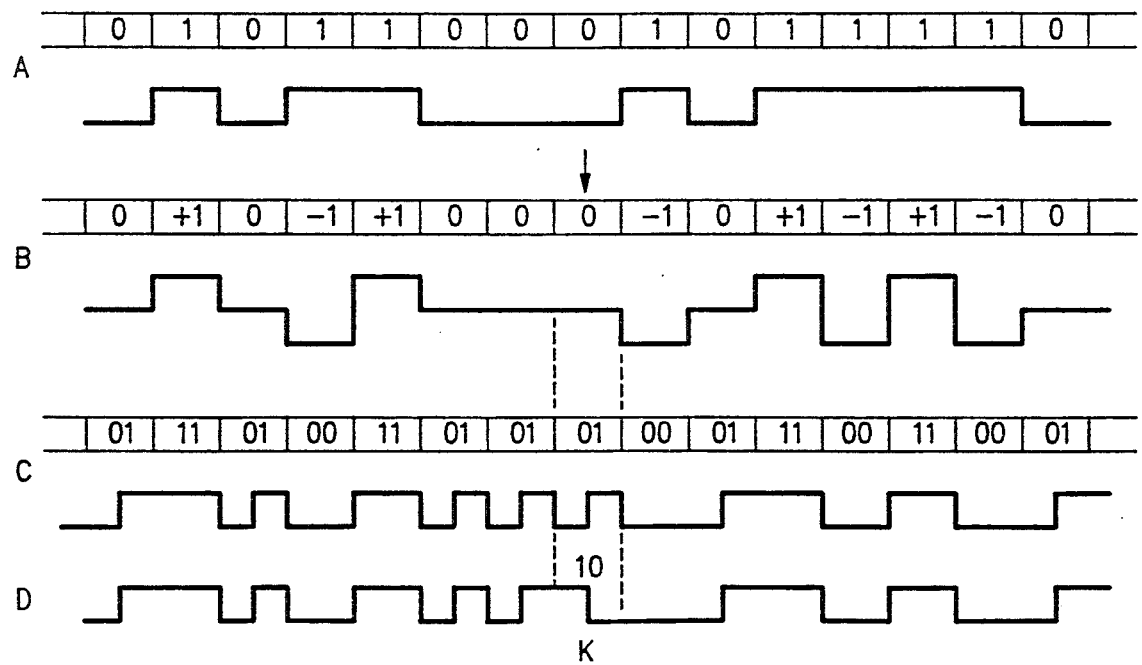

Referring to FIG. 2, there is shown an instance where the K bit replaces a 0 of the main channel followed by a 1 of either sign in the main channel. By comparing the signs of the 1 following the 0 and the 1 preceding the 0, it is recognized that a 0 has been replaced if the two 1s have opposite signs. A 1 could not have been replaced, as the presence of a 1 between two 1s of opposite signs would have represented a a bipolar violation of the AMI code rules. Thus, the regularity of the AMI code is used to determine which bit was replaced in the main channel.

Figure 3:
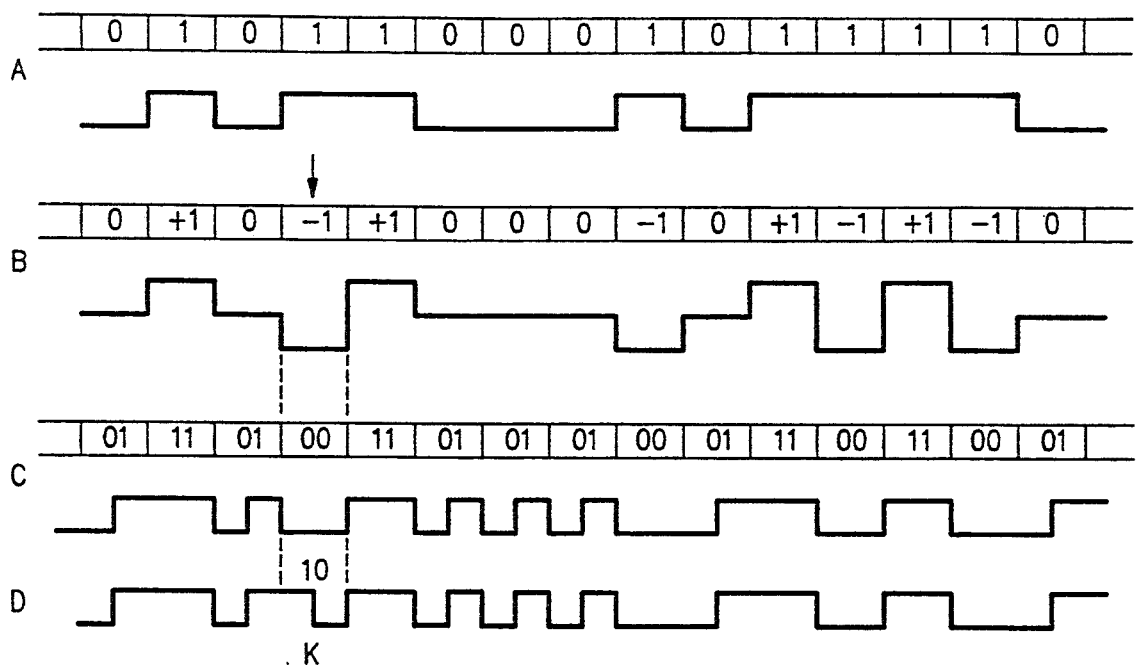

Referring to FIG. 3, there is shown an example of a situation where a K bit replaces a 1 of the main channel which is followed by another 1. In this case it can be determined that a 1 has been replaced by the K bit, since the 1 following the replaced bit and the 1 preceding the replaced bit have the same sign. The presence of a 0 in this bit position would have represented a bipolar violation of the AMI rules; therefore, a 1 must have been replaced.

In the situations illustrated in FIGS. 2 and 3, the sequential logic must be accompanied by a memory which retains the significance or sign of last 1 of the bit sequence. This memory is constantly updated so that it retains the sign of the last 1 to occur. In the examples of FIGS. 2 and 3, the signs of the 1s following and preceding the K bit are compared; and if the signs are opposite, it is known that the K bit replaced a 0, whereas if the signs are alike, the K bit replaced a 1.

Figure 4:
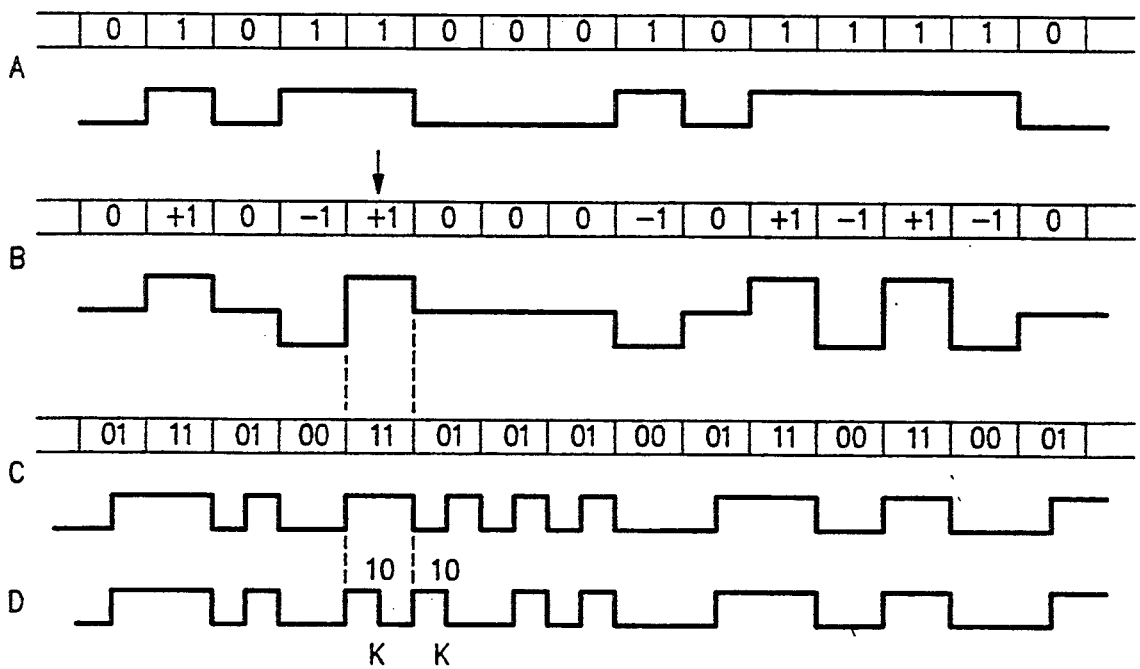

Referring to FIG. 4, there is an example where a K bit replaces a 1 of the main channel which is followed by a 0. In this situation, the 0 of the main channel following the replaced 1 is also automatically replaced by a K bit in the transcoder of the transmitting station. In the transcoder of the receiving station, it is recognized by definition that a bit sequence of 10 was replaced in the main channel when two sequential K bits are detected, with the first K bit being located in the time slot of the additional channel. The second K bit in the main channel is not evaluated as being part of the additional channel and is ignored.

In view of the above, it is apparent that an additional channel with a bit rate lower than that of the main channel can be inserted into the main channel without distorting the information of the main channel. This method is most conveniently used when the bit rate of the additional channel is an integral divisor of the bit rate of the main channel, in which case the spacing between bits of the additional channel will be constant. However, as mentioned earlier, this need not be the case. Varying spacing can be used, as long as the spacing is made known to the receiving station.

The above method is also applicable for use when the electrical HDB3 code is recoded to the optical MCMI code, since the rule of regularity of AMI is also applicable to the HDB3 code. The criteria for recovering the replaced main channel HDB3 coded bits include those described above and illustrated in FIGS. 1–4. However, two additional criteria apply for the HDB3 code.

If a V (bipolar violation) of the main channel followed by a 0 is replaced by the K bit, an MCMI bit sequence of 1001 will result which, according to definition, as illustrated in FIG. 1, means that a 0 bit of the original binary code was recoded to a V bit, which was replaced by the K bit.

Special circumstances apply if a K bit is inserted into an HDB3 bit combination representing a sequence of 0 level bits in the data flow. According to the HDB3 coding rules, a sequence of four 0s can be replaced with 000V or B00V, which is effectively 100V. In either case, the V always has the same sign as the 1 preceding it in the data flow, so that it represents a bipolar violation. If the combination 000V is used, the above-mentioned rules can be applied to determine which bit was replaced by a K bit. However, if the combination 100V is used, the previously-discussed rules can lead to an incorrect result if the V or the 0 preceding the V is replaced by a K. In this case, the K in the transcoder of the transmitting station is automatically preceded by a second K, which replaces the 0 preceding the V, or the first 0 of the 100V combination. In the transcoder of the receiving station, two consecutive Ks are recognized, as in the example of FIG. 4; however, in this case the extra, or second, K precedes the K located in the time slot pattern used for the additional optical channel. The sequential logic knows that, by considering the other preceding and subsequent bits, a V or a 0 has been replaced in a 0 sequence of the main channel.

Thus, the method of the present invention allows for the insertion of an additional optical channel into a main optical channel of data being conveyed over an optical waveguide. The additional channel has a bit rate less than that of the main channel and can be detected and extracted at the receiving station without difficulty. The replaced bits of the main channel can easily be reconstructed due to the regularity of the coding of the binary data stream. Thus, no bits of the main data stream are lost or distorted.

Figure 5:
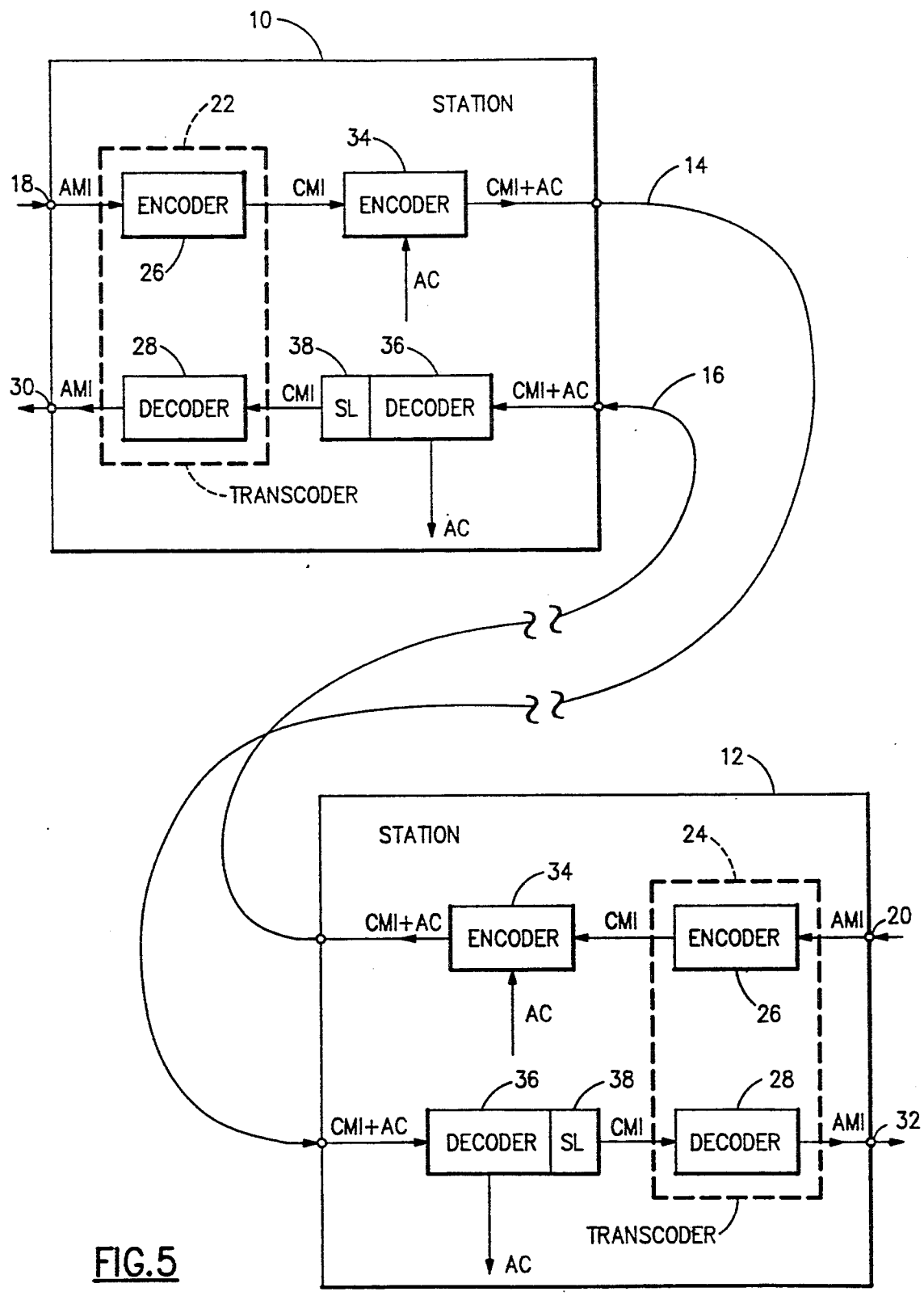
FIG. 5 is a block diagram of an optical data transmission system, which may be used to practice the method of the present invention.

Referring to FIG. 5, there is shown a block diagram of an optical data transmission system, which may be used to practice the present invention. Since data transmission systems generally transmit data bidirectionally, there are shown two stations, 10 and 12, connected by a pair of optical waveguides 14 and 16 for bidirectional transmission. Data in the form of an electrical signal, coded in the AMI code may be provided at the inputs 18 and 20 of stations 10 and 12 respectively. Stations 10 and 12 have transcoders 22 and 24 respectively, each of said transcoders including in the normal manner an encoder 26 and a decoder 28. The encoders 26 function to recode the data from the electrical AMI code to an optical CMI code, while the decoders decode the data from the optical CMI code to the electrical AMI code to provide data to station outputs 30 and 32.

The purpose of the present invention is to transmit an additional optical data channel, which data of course must be added to the optical data of the main channel. Thus, the additional channel identified as AC is encoded and added to the main channel by an encoder 34 in each station. The thus combined main channel and added channel may then be transmitted on the optical waveguides.

The encoder 34 functions to insert the forbidden CMI double bit combination into any desired position of the main optical channel, but thereafter at defined spaces as a replacement for a double bit combination of the main channel. The data of the additional channel is, of course, represented by binary 1s and 0s; therefore, only an additional channel bit of one selected significance is inserted as a forbidden bit combination. Additional channel bits of the other significance are represented by the absence of the forbidden bit combination in a defined space.

In a receiving portion of each station, the combined main channel and added channel is received by a decoder 36, which functions to sample at defined spacings the optical double bits received from the optical waveguide. The forbidden bit combination is easily recognized by the decoder 36, and once a forbidden bit combination is recognized and the spacing of the bits is known as previously discussed, the decoder 36 continuously samples the double bit combination at the known spacing. The presence of a forbidden bit combination in a sampled optical double bit represents an additional channel bit of one significance, while the absence of a forbidden bit combination in a sampled optical double bit at the defined space from the forbidden double bit, represents a bit of the additional optical channel of an opposite significance. Bits representing the significance of the sampled double bits are then outputted as the transmitted additional channel.

The bits of the main channel that were replaced by the forbidden bit combination are recovered through the use of sequential logic 38, which is designed to apply the fixed rules of the codes being used. The output of the sequential logic is provided to the decoder 28 so that the optical CMI code is decoded to the electrical AMI code which is outputted at the outputs 30 and 32.

What is claimed is:

1. A method of transmitting an additional optical channel of data in a system for transmission of a main optical channel of data between a transmitting and a receiving station by means of an optical waveguide, wherein the transmitting station receives the data as electrical bits coded in accordance with fixed rules and a transcoder in the transmitting station recodes the data to an optical code having double bits representing each electrical bit for transmission over the optical waveguide and the receiving station includes a transcoder for recoding the optical double bits back to the bits of the fixed electrical code, comprising the steps of:

inserting into the main channel, at the transcoder of the transmitting station, optical double bits in any desired position in place of double bits of the main channel at defined spacings known to the transcoder of the receiving station, said optical double bits representing bits of one significance of the additional optical channel and having a bit rate lower than that of the main channel, the bits of the additional optical channel being inserted into the main channel as double bits that are identical to a forbidden bit combination that results during the recoding of the electrical to the optical code;

sampling from the main channel at the transcoder of the receiving station, at said defined spacings the optical double bits, the presence of a forbidden bit combination in a sampled optical double bit representing a bit of one significance of the additional optical channel and the absence of a forbidden bit combination in a sampled optical double bit representing a bit of the additional optical channel of an opposite significance; and recovering, at the receiving station, the bits of the main channel that were replaced by the forbidden bit combination by means of sequential logic to apply the fixed rules of the electrical code to identify the replaced bits.

2. A method as described in claim 1, wherein the electrical code is the AMI code, and the optical code is the CMI code.

3. A method as described in claim 2, wherein the spacings between the bits of the main channel that are replaced by the double bits of the additional optical channel are constant.

4. A method as described in claim 2, wherein the spacings between the bits in the main channel that are replaced by the double bits of the additional optical channel vary in a known manner.

5. A method as described in claim 1, wherein the electrical code is the HDB3 code, and the optical code is the MCMI code.

6. A method as described in claim 5, wherein the spacings between the bits of the main channel that are replaced by the double bits of the additional optical channel are constant.

7. A method as described in claim 5, wherein the spacings between the bits in the main channel that are replaced by the double bits of the additional optical channel vary in a known manner.

8. A method as described in claim 1, wherein the spacings between the bits of the main channel that are replaced by the double bits of the additional optical channel are constant.

9. A method as described in claim 1, wherein the spacings between the bits in the main channel that are replaced by the double bits of the additional optical channel vary in a known manner.

10. A method as described in claim 1, wherein the defined spacings are determined prior to each transmission, and spacing information is transmitted to the receiving station by the transmitting station prior to transmitting data on the additional optical channel.

11. A method as described in claim 1, wherein the recovering step includes a step of sampling the double bit of the main channel following the inserted forbidden bit combination.

12. A method as described in claim 1, wherein the recovering step includes a step of comparing the sign of a one-level bit immediately following the inserted forbidden bit combination with the sign of a one-level bit immediately preceding the inserted forbidden bit combination, if the signs are opposite, a zero is recovered, if the signs are the same, a one is recovered.

13. A method as described in claim 1, wherein the step of inserting includes the steps of inserting a second forbidden bit combination in place of a double bit immediately following an inserted forbidden bit combination when the inserted forbidden bit combination replaced a one in the main channel followed by a zero, and the step of recovering includes the step of recognizing two sequential forbidden bit combinations.

* * * * *